Nov. 11, 1947.  H. O. PETERSON  2,430,780
RECORDING INSTRUMENT
Filed Dec. 19, 1942
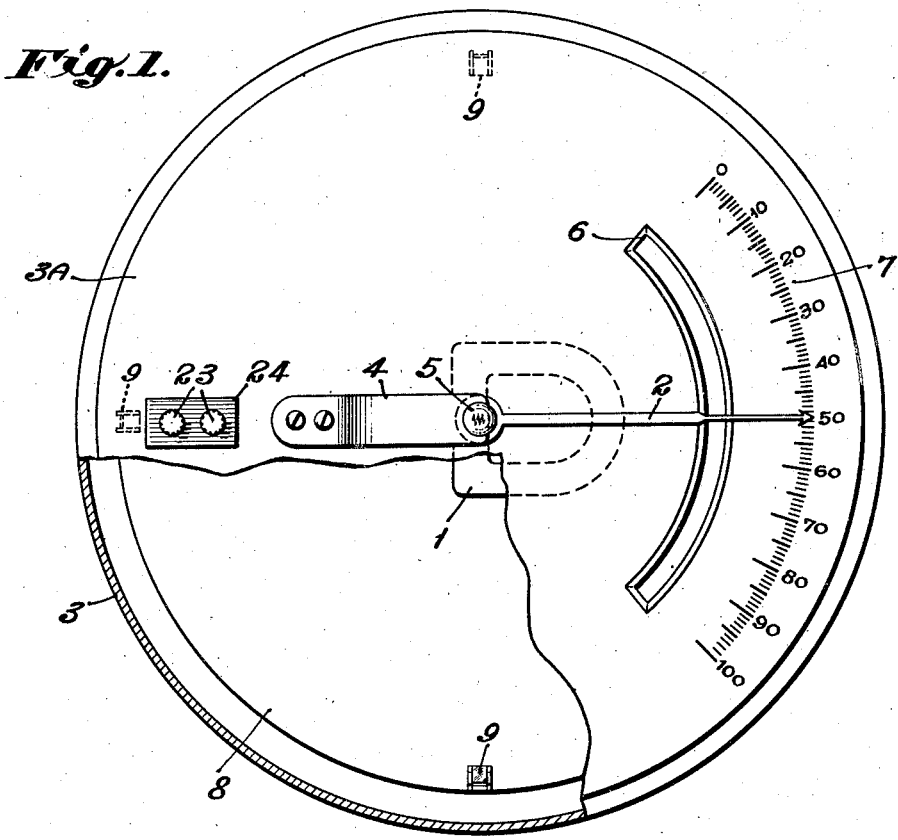
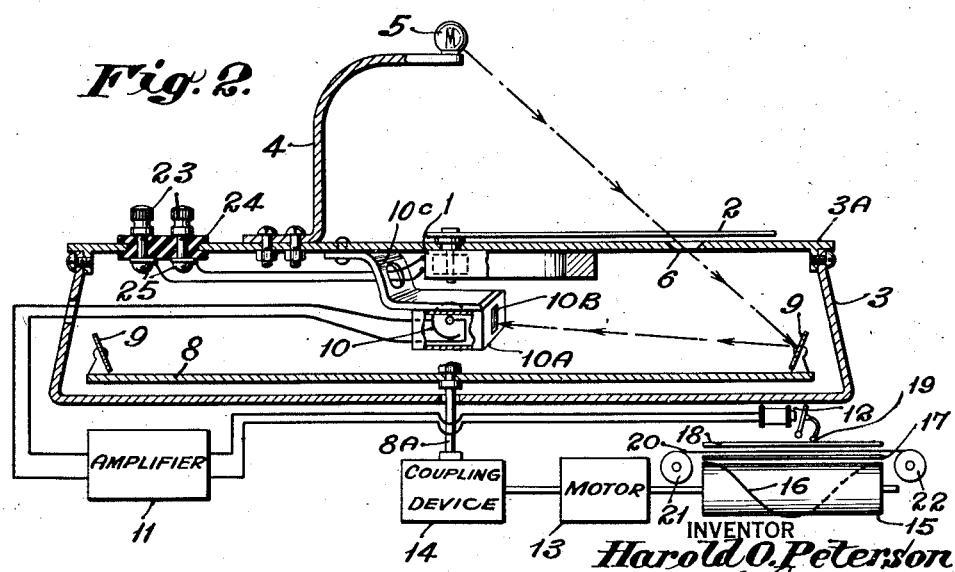
INVENTOR
Harold O. Peterson
BY
ATTORNEY Patented Nov. 11, 1947

2,430,780

UNITED STATES PATENT OFFICE 2,430,780

RECORDING INSTRUMENT

Harold O. Peterson, Riverhead, N. Y., assignor to Radio Corporation of America, a corporation of Delaware Application December 19, 1942, Serial No. 469,528

2 Claims. (Cl. 234—58)

1

This invention relates to a new and useful recording device for making a permanent record of any desirable data.

An object of this invention is to provide a simple and accurate recording device.

Another object of this invention is to provide an improved recording system whereby the position of the measuring indicator may be recorded without having mechanical contact between it and the recording device.

A feature of this invention is the novel arrangement of a measuring instrument and a photoelectric cell, both of which are enclosed within a casing having an arcuate slot through which a narrow stream of light passes to a rotated mirror system also located within the casing, the arrangement being such that the indicator of the measuring device intercepts the stream of light as it passes through the arcuate slot to be reflected by the mirror system to the photo-electric cell. The photo-electric cell then actuates a recording device, which is rotated simultaneously with the mirror system.

In the prior art there have been many instances where it has been desirable to make a record of a reading of a measuring instrument on a continuously moving chart, or paper, so as to plot a complete record of a phenomenon, or other data. In most of the prior art recording instruments the position of a galvanometer pointer, or indicator, is recorded periodically by allowing a bar to fall on the pointer so as to mark the paper through the medium of an inked ribbon interposed between the pointer and the paper. By this invention, an improved result is obtained by having no contact between the measuring instrument and the recording device.

This invention will best be understood by referring to the accompanying drawing, in which Fig. 1 is a plan view, partly in section, of the arrangement of this invention.

Fig. 2 is a cross-section of Fig. 1.

Referring now in detail to the drawing, a galvanometer 1, having a pointer 2, is mounted upon the underside of a casing 3, preferably of metal but not specifically limited thereto, as such a casing may also be made of any suitable plastic material. Located on the upper portion of casing 3 there is mounted an upright bracket 4, on which is located an incandescent lamp 5 which may be connected to any suitable voltage source, not shown. The lamp 5 is arranged for emitting a stream of light, the point of origin for the stream of light being located in the vertical axis of casing

2

3. In the upper, or cover, portion 3A of casing 3 there is located an arcuate slot 6, which is positioned directly below the pointer 2. Adjacent to the arcuate slot 6 there is located an index, or scale, 7 which is graduated into any suitable divisions of equal parts, such as from zero to one hundred (0–100). Located within the casing 3 there is arranged a rotatable disc 8, which has mounted thereon a plurality of mirrors 9, arranged to be set at such an angle as to reflect a pencil of light from source 5 to a photoelectric cell 10. The photoelectric cell 10 is arranged within a housing 10A which is fixed by any suitable means such as, for example, a bracket 10C secured to housing cover portion 3A. The photoelectric cell 10 is located at the axis of rotation of disc 8. A slit 10B is positioned in the front panel of housing 10A and arranged to permit passage of a pencil of light from lamp 5. A shaft 8A is provided for revolving disc 8 simultaneously with any suitable recording device. From the output terminals of the photoelectric cell there are electrical connections which connect to the input of amplifier 11. The output terminals of amplifier 11 are then connected to a sensitive electromagnet, or relay, 12. A motor 13 is arranged with a coupling device 14, which drives disc 8 through any suitable gear and sprocket devices so that only one revolution is made for disc 8 during four revolutions of a recording drum 15, which has arranged upon its outer surface a single helix, or raised spiral path 16. Directly above spiral path 16 there is located a recorder chart 17. A printer bar 18 is mechanically linked at 19 with the armature of relay 12. Interposed between members 17 and 18 there is an inked ribbon 20, which is wound upon drums 21 and 22 and actuated by any suitable coupling system (not shown) to a driving mechanism originating from motor 13. Electrical connections are made from galvanometer 1 to a pair of binding posts 23, which serve as the input connections from the source to be measured (not shown). The binding posts 23 are mounted upon an insulating strip 24, the internal connections being made to the galvanometer by suitable bolts 25.

In the arrangement of this system, the lamp 5, galvanometer 1, photoelectric cell system 10 and disc 8 are all situated along the common axis of shaft 8A. The motor driven recording drum 15 and the means, including members 12, 16, 18, 19, 20, 21 and 22, for marking the paper chart 17, may be similar in design to any of the well-known facsimile recording systems now in general use, therefore no detailed description of this system will be given.

It will be noted in Fig. 1 that the range of the galvanometer pointer 2 is shown as having a movement of approximately 90°, in which case it is desirable to provide four mirrors, disc 8 being arranged so as to make one revolution during four revolutions of the recording drum 15, assuming, of course, that the drum has a single helical raised portion. However, it may be desirable not to restrict the movement of pointer 2 to an angle of precisely 90°, but give a greater or lesser amount of movement, in which case the length of slot 6 will be increased or decreased accordingly. Also, the number of mirrors and the ratio of revolutions between disc 8 and disc 15 will be likewise increased or decreased.

In the operation of this device, as the disc 8 supporting the mirrors rotates about the axis of shaft 8A, light from lamp 5 shines through slot 6 at all times and is reflected by the mirrors, except for the moment when the mirror 9 lies in the shadow of pointer 2. The circuit of the amplifier 11 is connected so that when the light arriving at the photocell 10 is reduced or blocked due to a mirror passing through the shadow of pointer 2 the printing bar 18 is caused to operate. This operation, in conjunction with pressure against the single helix raised path 16 on the recording drum 15 causes a small inked mark to be made upon the recorder chart 17. The position of the mark on the recorder chart will be determined by the position of pointer 2. The use of the narrow slit 10B, which is placed in front of the photoelectric cell 10, results in a more definite change in the voltage across the input of amplifier 11 at the moment when the pencil of light originating from source 5 and passing through apertures 6 is blocked by pointer 2. The shadow caused by pointer 2 prevents some of the light rays reflected by mirror 9 from reaching the photo-electric cell 10 when intercepted.

A number of electro-optical systems associated with different measuring instruments having pointers can be connected to the electro-magnetic printing mechanism 18, 19, 20, 21 and 22. Also it is desired to have different records printed in different colors on chart 17.

I claim:

1. A recording device for recording data comprising a casing member having an arcuate aperture therein, a scanning disc located with said casing member, means for rotating said disc and a recording device simultaneously therewith, a plurality of mirrors arranged on said disc, means for generating a stream of light to shine in the path of said mirrors, a supporting member located outside said casing for securing said means for generating a stream of light so that some of its rays pass through said arcuate aperture in said casing member and is picked up by said mirrors, a measuring device having a movable pointer whose pivotal point is so located within said casing that it moves along said arcuate aperture to intercept some of the rays of said stream of light, a photoelectric cell located at the axis of rotation of said disc and arranged to receive the rays of light reflected by said mirrors, an amplifier electrically connected in a circuit to said photoelectric cell, and relay means electrically connected in a circuit to the output of said amplifier for actuating the marking element of said recording device which rotates simultaneously with said disc when the pointer of said measuring device intercepts some of the rays of said stream of light in accordance with varying positions thereof.

2. A device for recording data comprising a casing member having an arcuate aperture therein, a rotatable disc located within said casing member, means for rotating said disc simultaneously with a recording device, light reflecting means arranged on said disc, means located outside said casing for generating a stream of light, said means for generating said stream of light being positioned so that some of its rays pass through said arcuate aperture in said casing to be picked up by said light reflecting means, a photo-electric cell arranged to receive some of the rays reflected from said light reflecting means, a measuring device located within said casing and having means passing in the path of said arcuate aperture to intercept some of the rays from said stream of light, and electrical means connected from said photo-electric cell for actuating a marker on said recording device when the means on said measuring device intercepts some of the rays of said stream of light which are received by said photo-electric cell.

HAROLD O. PETERSON.

REFERENCES CITED

The following references are of record in the file of this patent:

UNITED STATES PATENTS

| Number | Name | Date |
| --- | --- | --- |
| 1,931,852 | Reichel et al. | Oct. 24, 1933 |
| 2,142,602 | Blethen | Jan. 3, 1939 |
| 2,164,114 | Kolb | June 27, 1939 |
| 2,228,883 | Morgan | Jan. 14, 1941 |
| 2,083,362 | Bryce | June 8, 1937 |
| 2,189,802 | Karlsson-Ygger | Feb. 13, 1940 |
| 2,348,711 | Chappell | May 16, 1944 |
| 2,351,081 | Swift | June 13, 1944 |
| 1,638,103 | Roucka | Aug. 9, 1927 |
| 1,660,921 | Fischer | Feb. 28, 1928 |

FOREIGN PATENTS

| Number | Country | Date |
| --- | --- | --- |
| 764,846 | France | Mar. 12, 1934 |